United States Patent
Tsukamoto

(10) Patent No.: US 7,335,719 B2
(45) Date of Patent: Feb. 26, 2008

(54) POLYESTER BASED ON POLY(TRIMETHYLENE TEREPHTHALATE)

(75) Inventor: Ryoji Tsukamoto, Matsuyama (JP)

(73) Assignee: Teijin Limited, Osaka (JP)

(*) Notice: Subject to any disclaimer, the term of this patent is extended or adjusted under 35 U.S.C. 154(b) by 0 days.

(21) Appl. No.: 10/466,304

(22) PCT Filed: Jul. 5, 2002

(86) PCT No.: PCT/JP02/06840

§ 371 (c)(1),
(2), (4) Date: Jul. 15, 2003

(87) PCT Pub. No.: WO03/004548

PCT Pub. Date: Jan. 16, 2003

(65) Prior Publication Data

US 2004/0116573 A1    Jun. 17, 2004

(30) Foreign Application Priority Data

Jul. 5, 2001   (JP)   ............ 2001-204474
Feb. 1, 2002   (JP)   ............ 2002-025212
Mar. 5, 2002   (JP)   ............ 2002-058513

(51) Int. Cl.
C08G 63/02 (2006.01)

(52) U.S. Cl. ............ 528/272; 428/364; 428/365; 524/710; 524/711; 524/713; 524/777; 524/783; 524/785; 528/275; 528/277; 528/279; 528/286; 528/287; 528/301; 528/302; 528/308; 528/308.6

(58) Field of Classification Search ........... 528/275, 528/277, 279, 286, 287, 301, 302, 308, 308.6; 524/710, 711, 713, 777, 783, 785; 428/364, 428/365

See application file for complete search history.

(56) References Cited

U.S. PATENT DOCUMENTS

| | | | |
|---|---|---|---|
| 3,515,700 A | | 6/1970 | Yokouchi et al. |
| 3,584,074 A | * | 6/1971 | Shima et al. ............ 525/425 |
| 5,656,716 A | * | 8/1997 | Schmidt et al. ............ 528/279 |
| 5,872,204 A | | 2/1999 | Kuo et al. |
| 6,284,370 B1 | * | 9/2001 | Fujimoto et al. ........... 428/364 |
| 2001/0003618 A1 | * | 6/2001 | Kato et al. ............ 428/395 |

FOREIGN PATENT DOCUMENTS

| | | |
|---|---|---|
| CN | 1154973 | 7/1997 |
| EP | 0 736 560 A2 | 10/1996 |
| EP | 1 110 988 A1 | 6/2001 |
| EP | 1110988 * | 6/2001 |
| JP | 2-133460 A | 5/1990 |
| JP | 03-234812 | 10/1991 |
| JP | 7-138354 A | 5/1995 |
| JP | 08-283393 | 10/1996 |
| JP | 11-60703 A | 5/1999 |
| JP | 11-200175 | 7/1999 |
| JP | 2000-109522 A | 4/2000 |
| JP | 2000-109552 | 4/2000 |
| JP | 2000-159876 A | 6/2000 |
| JP | 2000-302854 | 10/2000 |
| JP | 2001-26635 A | 1/2001 |
| JP | 2001-204474 A | 7/2001 |
| JP | 2001-261806 A | 9/2001 |
| JP | 2002-3621 A | 1/2002 |
| JP | 2002-3690 A | 1/2002 |
| TW | 438836 | 6/2001 |
| WO | WO 99/11709 A1 | 3/1999 |
| WO | WO 99/54039 A1 | 10/1999 |
| WO | WO 99/54379 A1 | 10/1999 |
| WO | WO 01/00706 A1 | 1/2001 |

* cited by examiner

*Primary Examiner*—Terressa Boykin
(74) *Attorney, Agent, or Firm*—Sughrue Mion, Pllc.

(57) ABSTRACT

A polyester based on poly(trimethylene terephthalate) consisting essentially of trimethylene terephthalate repeating units, comprising at least one kind of compound selected from the group consisting of alkali metal compounds, alkaline earth metal compounds and manganese compounds in an amount of 10 to 150 ppm expressed in terms of the metal element in a molar ratio of the total amount of elements of the contained alkali metal elements, alkaline earth metal elements and manganese element to the amount of the contained phosphorus element within the range of the following formula (I):

$$0 \leq P/M \leq 1 \qquad (I)$$

wherein, P is the molar amount of the phosphorus element in the polyester; M is the total amount of the alkali metal elements, alkaline earth metal elements and manganese element.

16 Claims, No Drawings

POLYESTER BASED ON POLY(TRIMETHYLENE TEREPHTHALATE)

TECHNICAL FIELD

The present invention relates to a polyester. More particularly, the present invention relates to a polyester based on poly(trimetylene terephthalate) slightly causing yellowing after light irradiation and having improved light resistance.

BACKGROUND ART

As well known, polyesters have been widely used as fibers, resins, films and the like due to excellent performances thereof. Especially, polyester fibers comprising polyethylene terephthalate and having excellent dimensional stability, heat, chemical and light resistances and the like have been utilized in various fields irrespective of clothing and nonclothing uses.

In the situation, attention has recently been paid to polyester fibers based on polytrimethylene terephthalate and a woven or a knitted fabric comprising the polyester fibers so as to exhibit hand and dyeability which are difficult to realize from the conventional polytrimethylene terephthalate [for example, JP-A (hereunder, JP-A means "Japanese Unexamined Patent Publication") 11-200175]. The polyester fibers based on the polytrimethylene terephthalate, however, have problems that degree of yellowing in light irradiation is greater than that of polyethylene terephthalate and light resistance is inferior to that of the polyethylene terephthalate.

As a method for improving the whiteness of the polytrimethylene terephthalate, the addition of a phosphorus compound during polymerization is proposed in, for example WO99/11709. An improvement in light resistance, however, cannot be expected by the method though the melt stability is improved.

On the other hand, for example, JP-A 3-234812 describes a method for adding a manganese compound, an antimony compound and a germanium compound to polyethylene terephthalate as a method for improving the light resistance of the polyester fibers. The method relates to the inhibition of the strength deterioration of the polyethylene terephthalate fibers and is a technique different from the prevention of yellowing, especially the prevention of yellowing of the polytrimethylene terephthalate fibers.

U.S. Pat. No. 5,872,204 describes the use of a manganese compound as a catalyst usable together with an antimony compound catalyst as a technique for adding a manganese compound to the polytrimethylene terephthalate. However, there is no description of an improvement in light resistance by the method, which has problems that foreign materials are readily produced in spinnerets during fiber formation because the antimony compound is used.

DISCLOSURE OF THE INVENTION

It is an object of the present invention to eliminate the problems possessed by the prior art and to provide a polyester based on the polytrimethylene terephthalate slightly causing yellowing after light irradiation and having improved light resistance.

BEST MODE FOR CARRYING OUT THE INVENTION

The mode for carrying out the present invention will be detailed hereinafter.

The polyester based on the polytrimethylene terephthalate is a polyester consisting essentially of trimethylene terephthalate repeating units.

The expression "consisting essentially of trimethylene terephthalate repeating units" refers to "the trimethylene terephthalate repeating units account for 85 mole % or more, preferably 90 mole % or more in the whole repeating units constituting the polyester.

It is necessary for the polyester of the present invention to contain at least one kind of compound selected from the group consisting of alkali metal compounds, alkaline earth metal compounds and manganese compounds in an amount of 10 to 150 ppm expressed in terms of the metal element. When the content of the element is less than 10 ppm, the light resistance of the finally obtained polyester fibers becomes insufficient. On the other hand, when the content exceeds 150 ppm, it is undesirable that the yellowness of the polyester polymer per se is increased and the yellowing and lowering of the molecular weight during remelting are increased. The content of the element is preferably within the range of 150 to 120 ppm, especially preferably within the range of 20 to 100 ppm.

Examples of the alkali metal used in the present invention include lithium, sodium, potassium, rubidium and the like. Examples of the alkaline earth metal include magnesium, calcium, strontium and the like.

Acetates, benzoates, hydrochlorides, formates, oxalates, nitrates, carbonates and the like can be used as the alkali metal compounds, alkaline earth metal compounds and manganese compounds employed in the present invention. Acetates and benzoates are preferable from the viewpoint of solubility in the polyester polymer. Furthermore, the compounds may be hydrates or anhydrides.

Further, in the polyester of the present invention, it is necessary that the molar ratio of the total amount of elements of the contained alkali metal elements, alkaline earth metal elements and manganese element to the amount of the contained phosphorus element satisfies the relationship of the following formula (I):

$$0 \leq P/M \leq 1 \tag{I}$$

wherein, P is the molar amount of the phosphorus element in the polyester; M is the total molar amount of the alkali metal elements, alkaline earth metal elements and manganese element.

In the formula (I), when P/M exceeds 1, the light resistance of the finally obtained fibers becomes insufficient. The P/M is preferably within the range of 0 to 0.8, especially preferably within the range of 0 to 0.6.

It is preferable that the polyester of the present invention simultaneously satisfies the following respective requirements (a) to (d):
(a) the intrinsic viscosity is within the range of 0.5 to 1.6,
(b) the content of dipropylene glycol is within the range of 0.1 to 2.0% by weight,
(c) the content of a cyclic dimer is within the range of 0.01 to 5% by weight and
(d) the color b value after crystallization is within the range of −5 to 10.

For explanation of the respective requirements, the mechanical strength of the finally obtained fibers is sufficiently high and handleability is more improved when the intrinsic viscosity is within the above range. The intrinsic viscosity is more preferably within the range of 0.55 to 1.5, especially preferably within the range of 0.6 to 1.4.

When the content of the dipropylene glycol is within the above range, the heat resistance of the polyester and mechanical strength of the finally obtained fibers become sufficiently high. The content of the dipropylene glycol is more preferably within the range of 0.15 to 1.8% by weight, especially preferably within the range of 0.2 to 1.5% by weight.

When the content of the cyclic dimer is within the above range, the yarn manufacturing property of the polyester is good. The content of the cyclic dimer is more preferably within the range of 0.02 to 1.8% by weight, especially preferably within the range of 0.03 to 1.5% by weight.

In addition, when the color b value after the crystallization is within the above range, the appearance of the finally obtained products is improved. The color b value is more preferably within the range of −4 to 9, especially preferably within the range of −3 to 8.

The polyester based on the polytrimethylene terephthalate of the present invention may be copolymerized with a component other than terephthalic acid component and trimethylene glycol component in an amount within the range without deteriorating characteristics of the polyester based on the polytrimethylene terephthalate, preferably within the range of 10 mole % or less based on the whole dicarboxylic acid component.

Examples of the copolymerization components include aromatic dicarboxylic acids such as isophthalic acid, orthophthalic acid, naphthalenedicarboxylic acid, diphenyldicarboxylic acid, diphenyletherdicarboxylic acid, diphenylsulfonedicarboxylic acid, benzophenonedicarboxylic acid, phenylindanedicarboxylic acid, 5-sulfoxyisophthalic acid metal salts or 5-sulfoxyisophthalic acid phosphonium salts, aliphatic glycols such as ethylene glycol, tetramethylene glycol, pentamethylene glycol, hexamethylene glycol, octamethylene glycol, decamethylene glycol, neopentylene glycol, diethylene glycol, triethylene glycol, polyethylene glycol, polytetramethylene glycol or cyclohexanediol, alicyclic glycols such as 1,4-cyclohexanedimethanol or 1,4-cyclohexanediol, aromatic glycols such as o-xylylene glycol, m-xylylene glycol, p-xylylene glycol, 1,4-bis(2-hydroxyethoxy)benzene, 1,4-bis(2-hydroxyethoxyethoxy) benzene, 4,4'-bis(2-hydroxyethoxy)biphenyl, 4,4'-bis(2-hydroxyethoxyethoxy)biphenyl, 2,2-bis [4-(2-hydroxyethoxy)phenyl]propane, 2,2-bis [4-(2-hydroxyethoxyethoxy)phenyl]propane, 1,3-bis(2-hydroxyethoxy)benzene, 1,3-bis(2-hydroxyethoxyethoxy) benzene, 1,2-bis(2-hydroxyethoxy)benzene, 1,2-bis(2-hyroxyethoxyethoxy)benzene, 4,4'-bis(2-hydroxyethoxy) diphenyl sulfone or 4,4'-bis(2-hyroxyethoxyethoxy) diphenyl sulfone, diphenols such as hydroquinone, 2,2-bis (4-hydroyphenyl)propane, resorcinol, catechol, dihydroxynaphthalene, dihydroxybiphenyl or dihydroxydiphenyl sulfone. One kind of the copolymerization components may be used alone or two or more kinds may be used in combination.

The polyester based on the poly(trimethylene terephthalate) can be produced by a conventionally known method. Namely, a transesterification method for subjecting a lower alkyl ester component of terephthalic acid and a trimethylene glycol component to transesterification in the presence of a transesterification catalyst, providing a bisglycol ester and/or its percondensate and then carrying out polymerizing reaction in the presence of a polymerizing reaction catalyst or a direct polymerization method or the like for directly esterifying terephthalic acid with trimethylene glycol, producing an oligomer of a low degree of polymerization and subsequently carrying out the polymerizing reaction in the presence of the polymerizing reaction catalyst can be adopted.

The solid-phase polymerization for the purpose of increasing the molecular weight, reducing the content of terminal carboxyl groups and the like can preferably be carried out by a conventional known method.

In the present invention, examples of compounds used as the transesterification catalyst include manganese compounds, cobalt compounds, calcium compounds, titanium compounds, sodium compounds, potassium compounds, zinc compounds, magnesium compounds and the like. The compounds may be used alone or two or more kinds may be used in combination. The titanium compounds used as a polycondensation catalyst can previously be added before transesterification and used as both the transesterification catalyst and the polycondensation reaction catalyst.

Examples of preferably used titanium compounds employed as the polymerizing reaction catalyst include a titanium tetraalkoxide alone, a reaction product of at least one kind of compound selected from the group consisting of phthalic acid, trimellitic acid, hemimellitic acid and pyromellitic acid or anhydrides thereof with the titanium tetraalkoxide, a reaction product of the titanium tetraalkoxide with a phosphonic acid compound, a reaction product of the titanium tetraalkoxide with a phosphinic acid compound, a reaction product of the titanium tetraalkoxide with a phosphate compound and a compound prepared by further carrying out reaction of the reaction product between at least the one kind of compound selected from the group consisting of phthalic acid, trimellitic acid, hemimellitic acid and pyromellitic acid or anhydrides thereof and the titanium tetraalkoxide with the phosphonic acid compound, phosphinic acid compound or phosphate compound. Titanium tetrabutoxide is especially preferably used as the titanium tetraalkoxide.

The molar ratio of the titanium tetraalkoxide to the phthalic acid, trimellitic acid, hemimellitic acid and pyromellitic acid or anhydrides thereof, phosphonic acid compound, phosphinic acid compound and phosphate compound is especially preferably about 1.5 to 2.5 based on the titanium tetraalkoxide.

Examples of the phosphonic acid compound to be reacted with the titanium tetraalkoxide include phenylphosphonic acid, methylposphonic acid, ethylphosphonic acid, propylphosphonic acid, isopropylphosphonic acid, butylphosphonic acid, tolylphosphonic acid, xylylphosphonic acid, biphenylphosphonic acid, naphthylphosphonic acid, anthrylphosphonic acid, 2-carboxyphenylphosphonic acid, 3-carboxyphenylphosphonic acid, 4-carboxyphenylphosphonic acid, 2,3-dicarboxyphenylphosphonic acid, 2,4-dicarboxyphenylphosphonic acid, 2,5-dicarboxyphenylphosphonic acid, 2,6-dicarboxyphenylphosphonic acid, 3,4-dicarboxyphenylphosphonic acid, 3,5-dicarboxyphenylphosphonic acid, 2,3,4-tricarboxyphenylphosphonic acid, 2,3,5-tricarboxyphenylphosphonic acid, 2,3,6-tricarboxyphenylphosphonic acid, 2,4,5-tricarboxyphenylphosphonic acid, 2,4,6-tricarboxyphenylphosphonic acid and the like.

Examples of the phosphinic acid compound include phenylphosphinic acid, methylphosphinic acid, ethylphosphinic acid, propylphosphinic acid, isopropylphosphinic acid, butylphosphinic acid, tolylphosphinic acid, xylylphosphinic acid, biphenylylphosphinic acid, diphenylphosphinic acid, dimethylphosphinic acid, diethylphosphinic acid, dipropylphosphinic acid, diisopropylphosphinic acid, dibutylphosphinic acid, ditolylphosphinic acid, dixylylphosphinic acid, dibiphenylylphosphinic acid, naphthylphosphinic acid, anthrylphosphinic acid, 2-carboxyphenylphosphinic acid, 3-carboxyphenylphosphinic acid, 4-carboxyphenylphosphinic acid, 2,3-dicarboxyphenylphosphinic acid, 2,4-dicarboxyphenylphosphinic acid, 2,5-dicarboxyphenylphosphinic acid, 2,6-dicarboxyphenylphosphinic acid, 3,4-dicarboxyphenylphosphinic acid, 3,5-dicarboxyphenylphosphinic acid, 2,3,4-tricarboxyphenylphosphinic acid, 2,3,5-tricarboxyphenylphosphinic acid, 2,3,6-tricarboxyphenylphosphinic acid, 2,4,5-tricarboxyphenylphosphinic acid, 2,4,6-tricarboxyphenylphosphinic acid, bis(2-carboxyphenyl)phosphinic acid, bis(3-carboxyphenyl)phosphinic acid, bis(4-carboxyphenyl)phosphinic acid, bis(2,3-dicarboxyphenyl)phosphinic acid, bis(2,4-dicarboxyphenyl)phosphinic acid, bis(2,5-dicarboxyphenyl)phosphinic acid, bis(2,6-dicarboxyphenyl)phosphinic acid, bis(3,4-dicarboxyphenyl)phosphinic acid, bis(3,5-dicarboxyphenyl)phosphinic acid, bis(2,3,4-tricarboxyphenyl)phosphinic acid, bis(2,3,5-tricarboxyphenyl)phosphinic acid, bis(2,3,6-tricarboxyphenyl)phosphinic acid, bis(2,4,5-tricarboxyphenyl)phosphinic acid, bis(2,4,6-tricarboxyphenyl)phosphinic acid and the like.

Furthermore, examples of the phosphate compound include monoalkyl phosphates and monaryl phosphates such as monomethyl phosphate, monoethyl phosphate, monotrimethyl phosphate, mono-n-butyl phosphate, monohexyl phosphate, monoheptyl phosphate, monooctyl phosphate, monononyl phosphate, monodecyl phosphate, monododecyl phosphate, monolauryl phosphate, monooleyl phosphate, monotetradecyl phosphate, monophenyl phosphate, monobenzyl phosphate, mono(4-dodecyl)phenyl phosphate, mono(4-methylphenyl) phosphate, mono(4-ethylphenyl) phosphate, mono(4-propylphenyl) phosphate, mono(4-dodecylphenyl) phosphate, monotolyl phosphate, monoxylyl phosphate, monobiphenyl phosphate, mononaphthyl phosphate, monoanthryl phosphate and the like.

The polyester based on the poly(trimethylene terephthalate) of the present invention, if necessary, may contain a small amount of an additive, for example, a lubricant, a pigment, a dye, an antioxidant, a solid-phase polymerization accelerator, a fluorescent brightener, an antistatic agent, an antimicrobial agent, an ultraviolet light absorber, a light stabilizer, a heat stabilizer, a light screen, a delustering agent and the like.

In the polyester of the present invention, at least one kind of compound selected from the group consisting of alkali metal compounds alkaline earth metal compounds and manganese compounds is contained at a high concentration exceeding 150 ppm to 10000 ppm expressed in terms of the metal element to provide a polyester containing the metal compound at the high concentration. With a polyester based on the poly(trimethylene terephthalate), is melt kneaded 0.5 to 50% by weight of the polyester containing the metal compound at the high concentration. Thereby, at least the one kind of compound selected from the group consisting of the alkali metal compounds, the alkaline earth metal compounds and the manganese compounds may be contained so as to provide at least the one compound in an amount of 10 to 150 ppm expressed in terms of the metal element in the polyester based on the poly(trimethylene terephthalate).

In this case, when the amount of the polyester containing the metal compound at the high concentration is 0.5% by weight or less, it is difficult to uniformly disperse the metal compound in the polyester. When the amount exceeds 50% by weight, the production efficiency of the polyester based on the poly(trimethylene terephthalate) is inferior because the amount used of the polyester containing the metal compound at the high concentration is too large. When the polyester containing the metal compound at the high concentration is used, the amount thereof used is preferably within the range of 0.7 to 40% by weight, more preferably within the range of 1 to 30% by weight.

When the polyester containing the metal compound at the high concentration is to be used, the necessity for using a large amount of the polyester containing the metal compound at the high concentration arises in order to maintain the light resistance of the finally obtained fibers at a sufficient level if the content of the metal element is 150 ppm or less. On the other hand, when the content of the metal element exceeds 10000 ppm, it is difficult to control the quality of the finally obtained fibers because the yellowness of the polyester containing the metal compound at the high concentration per se is increased and further the lowering of molecular weight by thermal decomposition is marked if the content exceeds 10000 ppm. Thereby, the content of the metal element is more preferably within the range of 300 to 8000 ppm, especially preferably within the range of 500 to 5000 ppm.

Methods for melt kneading the polyester containing the metal compound at the high concentration with the polyester based on the poly(trimethylene terephthalate) are not especially limited; however, examples of the methods include a method for adding a solid or a molten polyester containing the metal compound at the high concentration to the polyester based on the poly(trimethylene terephthalate) melted with, for example a twin-screw extruder using a side feeder or the like, a method for chip blending the polyester based on the poly(trimethylene terephthalate) with the polyester containing the metal compound at the high concentration and then melt kneading the blended chips, a method for adding chips of the polyester containing the metal compound at the high concentration into a polymerizing reaction vessel in a polymerizing reaction stage of the polyester based on the poly(trimethylene terephthalate polymerized by a batch method and the like.

The fibers comprising the polyester based on the poly (trimethylene terephthalate) of the present invention may be produced by melt spinning the polyester based on the poly(trimethylene terephthalate) at a temperature within the range of 238 to 275° C., and yarn breakage during the spinning does not occur when the melt spinning temperature is within the range. The melt spinning temperature is preferably within the range of 239 to 270° C., especially preferably within the range of 240 to 265° C. The spinning speed when the melt spinning is carried out may be set within the range of 400 to 5000 m/min. When the spinning speed is within the range, the strength of the obtained fibers is sufficient and the fibers can stably be wound. The spinning speed is more preferably within the range of 500 to 4700 m/min, especially preferably within the range of 600 to 4500 m/min.

The shape of a spinneret used during the spinning is not especially limited, and any of a circular, a modified cross-section, a solid, a hollow shapes and the like can be adopted.

A polyester dawn yarn based on the poly(trimethylene terephthalate) in the present invention can be obtained by winding the polyester fibers of the poly(trimethylene terephthalate) or, without winding the polyester fibers once, and continuously subjecting the fibers to the drawing treatment.

The polyester fibers and polyester drawn yarn based on the poly(trimethylene terephthalate) of the present invention have an intrinsic viscosity preferably within the range of 0.5 to 1.5. When the intrinsic viscosity is within the range, the mechanical strength of the finally obtained fibers is sufficiently high and handling is improved. The intrinsic viscosity is more preferably within the range of 0.52 to 1.4, especially preferably within the range of 0.55 to 1.3.

A fabric having a value of an increase in color b value of 2 or less after irradiation at a humidity of 50% RH and 60° C. for 80 hours with a sunshine weatherometer can be obtained by using the polyester fibers and/or polyester drawn yarn of the present invention.

EXAMPLES

The present invention will be explained more specifically hereafter with examples. The present invention, however, is not limited by the examples at all. Respective values in the examples were measured according to the following methods.

(1) Intrinsic Viscosity:

The intrinsic viscosity was obtained by carrying out measurements at 35° C. according to a conventional method using o-chlorophenol as a solvent.

(2) Measurements of Calcium Content, Rubidium Content, Manganese Content, Cobalt Content and Phosphorus Content in Polyester:

A sample polymer was thermally melted to prepare a circular disk, and the contents were obtained according to a conventional method using a fluorescent X-ray apparatus manufactured by Rigaku Corporation.

(3) Measurements of Sodium Content, Potassium Content, Lithium Content and Magnesium Content in Polyester:

One g of a sample polymer was dissolved in 10 ml of o-chlorophenol, mixed with 20 ml of 0.5 N-HCl and allowed to stand overnight. The contents were obtained by carrying out measurements of the supernatant HCl solution according to a conventional method using Z-6100 Polarized Zeeman Atomic Absorption Spectrophotometer manufactured by Hitachi, Ltd.

(4) Content of Dipropylene Glycol

A sample polymer, together with an excessive amount of methanol, was sealed in a tube and subjected to methanolysis under conditions of 260° C. for 4 hours in an autoclave, and the amount of dipropylene glycol in the decomposition product was determined according to a conventional method using a gas chromatography (HP6890 Series GC System manufactured by Hewlett-Packard Company). The weight percentage of the dipropylene glycol based on the weight of the measured polymer was obtained.

(5) Content of Cyclic Dimer

In 1 ml of hexafluoroisopropanol, was dissolved 1 mg of a sample polymer. A sample solution prepared by diluting the resulting solution with chloroform until the volume reached 10 ml was injected by using an apparatus in which two GPC columns TSK gel G2000H8 manufactured by Waters Corporation were connected in a model 486 liquid chromatograph manufactured by Waters Corporation. Chloroform was used as a developing solvent, and the content of the cyclic dimer of the polymer was obtained from a calibration curve of the previously prepared standard cyclic dimer.

(6) Color b Value After Crystallization

The color of chips was obtained after drying at 130° C. for 2 hours and the color of fibers was obtained after knitting the fibers into a knitted fabric according to a conventional method using a color-difference meter (model: CR-200) manufactured by Minolta Co., Ltd.

(7) Tensile Strength and Tensile Elongation

Measurements were carried out according to the method described in JIS L1070.

(8) Evaluation of Light Resistance

A sample prepared by knitting fibers into a knitted fabric was irradiated under conditions of 60° C., 80 hours and a humidity of 50% RH without rainfall using a sunshine weatherometer (manufactured by Suga Test Instruments Co., Ltd.). The color b values of the sample before and after the irradiation were measured to calculate an increase in color b value.

Reference Example 1

Production of a Catalyst Comprising a Reaction Product of Titanium Tetrabutoxide with Trimellitic Anhydride Tetrabutoxytitnium in an amount of 0.5 mole based on 1 mole of trimellitic anhydride was added to a trimethylene glycol solution (0.2%) of trimellitic anhydride, and the resulting mixture was kept at 80° C. under atmospheric pressure in air and reacted for 60 minutes. The resultant reaction mixture was then cooled to normal temperature, and the produced catalyst was recrystallized with acetone in an amount of 10 times. The deposited substance was filtered through a filter paper and dried at 100° C. for 2 hours to provide the objective catalyst.

Reference Example 2

Production of a Catalyst Comprising a Reaction Product of Titanium Tetrabutoxide with Phenylphosphonic Acid Tetrabutoxytitanium in an amount of 0.5 mole based on 1 mole of phenylphosphonic acid was added to a trimethylene glycol solution (0.2%) of the phenylphosphonic acid, and the resulting mixture was kept at 120° C. under atmospheric pressure in air and reacted for 60 minutes to afford the objective catalyst as a white slurry.

Reference Example 3

Production of a Catalyst Comprising a Reaction Product of Titanium Tetrabutoxide with Phenylphosphinic Acid Tetrabutoxytitanium in an amount of 0.5 mole based on 1 mole of phenylphosphinic acid was added to a trimethylene glycol solution (0.2%) of the phenylphosphinic acid, and the resulting mixture was kept at 120° C. under atmospheric pressure in air and reacted for 60 minutes to provide the objective catalyst as a white slurry.

Example 1

A reactor equipped with a stirrer, a rectifying column and a methanol distilling off condenser was charged with 100 parts by weight of dimethyl terephthalate, 70.5 parts by weight of trimethylene glycol and 0.0316 part by weight of manganese acetate tetrahydrate as a transesterification catalyst, and transesterification was carried out while slowly heating up the mixture from 140° C. and distilling off methanol produced as a result of the reaction to the outside of the system. The internal temperature reached 210° C. after the passage of 3 hours from the start of reaction.

To the resulting reaction product, was added 0.0526 part by weight of titanium tetrabutoxide as a polymerizing reaction catalyst. The resulting mixture was then transferred to another reactor equipped with a stirrer and a glycol distilling off condenser, and polymerizing reaction was carried out while slowly heating up the mixture from 210° C. to 265° C. and reducing the pressure from atmospheric pressure to a high vacuum of 70 Pa. The polymerizing reaction was finished when the intrinsic viscosity reached 0.75 while tracing the melt viscosity of the reaction system.

The molten polymer was extruded from the bottom of the reactor in a strand form into cooling water and cut with a strand cutter into chips. Table 1 shows the results.

The resultant chips were melted at 250° C. using an extrusion spinning machine equipped with a spinneret provided with 36 circular spinning holes having a hole diameter of 0.27 mm and spun at a throughput of 34 g/min and a takeoff speed of 2400 m/min. The resulting undrawn yarn was fed to a drawing treating machine equipped with a heating roller at 60° C. and a plate heater at 160° C. and subjected to drawing treatment at a draw ratio of 1.7 times to provide an 83 dtex/36 filament drawn yarn. Table 2 shows the results.

Example 2

Procedures were carried out in the same manner as in Example 1, except that 0.0316 part by weight of manganese acetate tetrahydrate and 0.0038 part by weight of cobalt acetate tetrahydrate were used in combination as a transesterification catalyst in Example 1. Tables 1 and 2 show the results.

Example 3

Procedures were carried out in the same manner as in Example 1, except that the polymerizing reaction catalyst was changed from the titanium tetrabutoxide and the catalyst prepared in Reference Example 1 in an amount of 30 mmole % expressed in terms of titanium atom was used in Example 1. Tables 1 and 2 show the results.

Example 4

Procedures were carried out in the same manner as in Example 1, except that the polymerizing reaction catalyst was changed from the titanium tetrabutoxide and the catalyst prepared in Reference Example 2 in an amount of 30 mmole % expressed in terms of titanium atom was used in Example 1. Tables 1 and 2 show the results.

Example 5

Procedures were carried out in the same manner as in Example 1, except that the polymerizing reaction catalyst was changed from the titanium tetrabutoxide and the catalyst prepared in Reference Example 3 in an amount of 30 mmole % expressed in terms of titanium atom was used in Example 1. Tables 1 and 2 show the results.

Example 6

Procedures were carried out in the same manner as in Example 1, except that 0.009 part by weight of trimethyl phosphate was added after completing the transesterification in Example 1. Tables 1 and 2 show the results.

Example 7

Procedures were carried out in the same manner as in Example 2, except that 0.009 part by weight of trimethyl phosphate was added after completing the transesterification in Example 2. Tables 1 and 2 show the results.

Example 8

The chips obtained by the procedures in Example 1 were melted at 250° C. with an extrusion spinning machine equipped with a spinneret provided with 36 circular spinning holes having a hole diameter of 0.27 mm and spun at a throughput of 36 g/min and a takeoff speed of 3600 m/min. The resulting undrawn yarn was fed to a drawing treating machine equipped with a heating roller at 60° C. and a plate heater at 160° C. and subjected to drawing treatment at a draw ratio of 1.2 times to afford an 83 dtex/36 filament drawn yarn. Tables 1 and 2 show the results.

Example 9

The chips obtained by the procedures in Example 1 were melted with an extrusion spinning machine equipped with a spinneret provided with 36 circular spinning holes having a hole diameter of 0.27 mm, spun at a throughput of 34 g/min and a takeoff speed of 2400 m/min and, without being wound once, fed to a drawing treating machine equipped with a heating roller at 60° C. and a plate heater at 160° C. and subjected to drawing treatment at a draw ratio of 1.7 times to provide an 83 dtex/36 filament drawn yarn. Tables 1 and 2 show the results.

Example 10

A reactor equipped with a stirrer, a rectifying column and a methanol distilling off condenser was charged with 100 parts by weight of dimethyl terephthalate, 70.5 parts by weight of trimethylene glycol and 0.0526 part by weight of titanium tetrabutoxide as a catalyst and further 0.0126 part by weight of potassium acetate and transesterification was carried out while slowly heating up the mixture from 140° C. and distilling off methanol produced as a result of the reaction. The internal temperature reached 210° C. after the passage of 3 hours from the start of the reaction.

The resulting reaction product was then transferred to another reactor equipped with a stirrer and a glycol distilling off condenser and polymerizing reaction was carried out while slowly heating up the reaction product from 210° C. to 265° C. and reducing the pressure from atmospheric pressure to a high vacuum of 70 Pa. The polymerizing reaction was finished when the intrinsic viscosity reached 0.75 while tracing the melt viscosity of the reaction system.

The molten polymer was then extruded from the bottom of the reactor in a strand form into cooling water and cut with a strand cutter into chips. Table 1 shows the results.

The obtained chips were melted at 250° C. with an extrusion spinning machine equipped with a spinneret provided with 36 circular spinning holes having a hole diameter of 0.27 mm at a throughput of 34 g/min and a takeoff speed of 2400 m/min. The resulting undrawn yarn was fed to a drawing treating machine equipped with a heating roller at 60° C. and a plate heater at 160° C. and subjected to drawing treatment at a draw ratio of 1.7 times to afford an 83 dtex/36 filament drawn yarn. Table 2 shows the results.

Example 11

Procedures were carried out in the same manner as in Example 10, except that the amount of the potassium acetate used was changed from 0.0126 part by weight and 0.00758 part by weight of the potassium acetate was used in Example 10. Tables 1 and 2 show the results.

Example 12

Procedures were carried out in the same manner as in Example 10, except that 0.0126 part by weight of potassium acetate was changed and 0.0175 part by weight of sodium acetate trihydrate was used in Example 10. Tables 1 and 2 show the results.

Example 13

Procedures were carried out in the same manner as in Example 10, except that 0.0126 part by weight of the potassium acetate was changed and 0.0085 part by weight of lithium acetate was used in Example 10. Tables 1 and 2 show the results.

Example 14

Procedures were carried out in the same manner as in Example 10, except that 0.0126 part by weight of potassium acetate was changed and 0.0186 part by weight of rubidium acetate was used in Example 10. Tables 1 and 2 show the results.

Example 15

Procedures were carried out in the same manner as in Example 10, except that 0.0126 part by weight of potassium acetate was changed and 0.0227 part by weight of calcium acetate monohydrate was used in Example 10. Tables 1 and 2 show the results.

Example 16

Procedures were carried out in the same manner as in Example 10, except that 0.0126 part by weight of potassium acetate was changed and 0.0276 part by weight of magnesium acetate tetrahydrate was used in Example 10. Tables 1 and 2 show the results.

Example 17

Procedures were carried out in the same manner as in Example 10, except that the titanium tetrabutoxide was changed and the catalyst prepared in Reference Example 1 in an amount of 30 mmole % expressed in terms of titanium atom was used in Example 10. Tables 1 and 2 show the results.

Example 18

Procedures were carried out in the same manner as in Example 10, except that the titanium tetrabutoxide was changed and the catalyst prepared in Reference Example 2 in an amount of 30 mmole % expressed in terms of titanium atom was used in Example 10. Tables 1 and 2 show the results.

Example 19

Procedures were carried out in the same manner as in Example 10, except that 0.009 part by weight of trimethyl phosphate was added into the reaction system just after completing the transesterification in Example 10. Tables 1 and 2 show the results.

Example 20

The chips obtained by procedures in Example 10 were melted at 250° C. with an extrusion spinning machine equipped with a spinneret provided with 36 circular spinning holes having a hole diameter of 0.27 mm and spun at a throughput of 36 g/min and a takeoff speed of 3600 m/min, and the resulting undrawn yarn was fed to a drawing treating machine equipped with a heating roller at 60° C. and a plate heater at 160° C. and subjected to drawing treatment at a draw ratio of 1.7 times to provide an 83 dtex/36 filament drawn yarn. Tables 1 and 2 show the results.

Example 21

The chips obtained by procedures in Example 10 were melted at 250° C. with an extrusion spinning machine equipped with a spinneret provided with 36 circular spinning holes having a hole diameter of 0.27 mm and spun at a throughput of 34 g/min and a takeoff speed of 2400 m/min, and the resulting undrawn yarn, without being wound once, was fed to a drawing treating machine equipped with a heating roller at 60° C. and a plate heater at 160° C. and subjected to drawing treatment at a draw ratio of 1.7 times to afford an 83 dtex/36 filament drawn yarn. Tables 1 and 2 show the results.

Comparative Example 1

Procedures were carried out in the same manner as in Example 1, except that 0.0525 part by weight of the titanium tetrabutoxide was used to carry out transesterification without using manganese acetate tetrahydrate and polymerizing reaction was then conducted without conducting further addition at all in Example 1. Table 1 shows the results.

Comparative Example 2

Procedures were carried out in the same manner as in Example 1, except that the amount of the added manganese acetate tetrahydrate was changed to 0.0885 part by weight in Example 1. Tables 1 and 2 show the results.

Comparative Example 3

Procedures were carried out in the same manner as in Example 6, except that the amount of the added trimethyl phosphate was changed to 0.027 part by weight in Example 6. Tables 1 and 2 show the results.

Comparative Example 4

Procedures were carried out in the same manner as in Example 10, except that the amount of the added potassium acetate was changed to 0.0405 part by weight in Example 10. Tables 1 and 2 show the results.

Comparative Example 5

Procedures were carried out in the same manner as in Example 10, except that the amount of the added trimethyl phosphate was changed to 0.027 part by weight in Example 10. Tables 1 and 2 show the results.

TABLE 1

| | Polymer | | | | | | | | | | | | |
|---|---|---|---|---|---|---|---|---|---|---|---|---|---|
| | (1) | | (2) | | (3) | (4) | (5) | (6) | P/M Molar Ratio | (7) | (8) % by weight | (9) % by weight | (10) |
| | Kind | mmole % | Kind | mmole % (11) | mmole % | ppm | ppm | ppm | | | | | b value |
| Ex. 1 | Mn(OAc)$_2$·4H$_2$O | 25 | TBT | 30 | — | — | — | 66 | 0.0 | 0.75 | 0.23 | 2.0 | 6.8 |
| Ex. 2 | Mn(OAc)$_2$·4H$_2$O Co(OAc)$_2$·4H$_2$O | 25 3 | TBT | 30 | — | — | — | 66 | 0.0 | 0.75 | 0.23 | 2.1 | 4.9 |
| Ex. 3 | Mn(OAc)$_2$·4H$_2$O | 25 | TMT | 30 | — | — | — | 66 | 0.0 | 0.75 | 0.25 | 2.1 | 6.5 |
| Ex. 4 | Mn(OAc)$_2$·4H$_2$O | 25 | TPO | 30 | — | — | — | 66 | 0.5 | 0.75 | 0.26 | 2.0 | 6.0 |
| Ex. 5 | Mn(OAc)$_2$·4H$_2$O | 25 | TPI | 30 | 12.5 | — | — | 66 | 0.5 | 0.75 | 0.24 | 2.1 | 6.2 |
| Ex. 6 | Mn(OAc)$_2$·4H$_2$O | 25 | TBT | 30 | 12.5 | — | — | 66 | 0.5 | 0.75 | 0.23 | 2.0 | 5.9 |
| Ex. 7 | Mn(OAc)$_2$·4H$_2$O Co(OAc)$_2$·4H$_2$O | 25 3 | TBT | 30 | — | — | — | 66 | 0.5 | 0.75 | 0.24 | 2.1 | 4.8 |
| Ex. 8 | Mn(OAc)$_2$·4H$_2$O | 25 | TBT | 30 | — | — | — | 66 | 0.0 | 0.75 | 0.23 | 2.0 | 6.8 |
| Ex. 9 | Mn(OAc)$_2$·4H$_2$O | 25 | TBT | 30 | — | — | — | 66 | 0.0 | 0.75 | 0.23 | 2.0 | 6.8 |
| Ex. 10 | KOAc | 25 | TBT | 30 | — | 51 | — | — | 0.0 | 0.75 | 0.21 | 2.1 | 6.6 |
| Ex. 11 | KOAc | 15 | TBT | 30 | — | 31 | — | — | 0.0 | 0.75 | 0.22 | 2.0 | 5.0 |
| Ex. 12 | Na(OAc)$_2$3H$_2$O | 25 | TBT | 30 | — | 51 | — | — | 0.0 | 0.75 | 0.23 | 2.1 | 6.0 |
| Ex. 13 | LiOAc | 25 | TBT | 30 | — | 9 | — | — | 0.0 | 0.75 | 0.22 | 1.9 | 5.5 |
| Ex. 14 | RbOAc | 25 | TBT | 30 | — | 111 | — | — | 0.0 | 0.75 | 0.24 | 2.1 | 7.2 |
| Ex. 15 | Ca(OAc)$_2$.H$_2$O | 25 | TBT | 30 | — | — | 52 | — | 0.0 | 0.75 | 0.23 | 2.2 | 6.0 |
| Ex. 16 | Mg(OAc)$_2$·4H$_2$O | 25 | TBT | 30 | — | — | 32 | — | 0.0 | 0.75 | 0.21 | 2.0 | 5.6 |
| Ex. 17 | KOAc | 25 | TMT | 30 | — | 51 | — | — | 0.0 | 0.75 | 0.22 | 2.1 | 6.7 |
| Ex. 18 | KOAc | 25 | TPO | 30 | — | 51 | — | — | 0.0 | 0.75 | 0.20 | 2.1 | 6.8 |
| Ex. 19 | KOAc | 25 | TBT | 30 | 12.5 | 51 | — | — | 0.5 | 0.75 | 0.21 | 1.9 | 5.5 |
| Ex. 20 | KOAc | 25 | TBT | 30 | — | 51 | — | — | 0.0 | 0.75 | 0.21 | 2.1 | 6.6 |
| Ex. 21 | KOAc | 25 | TBT | 30 | — | 51 | — | — | 0.0 | 0.75 | 0.21 | 2.1 | 6.6 |
| (12) | TBT | 30 | — | — | — | — | — | — | — | 0.75 | 0.21 | 2.0 | 5.1 |
| (13) | Mn(OAc)$_2$·4H$_2$O | 70 | TBT | 30 | — | — | — | 185 | 0.0 | 0.75 | 0.25 | 2.1 | 10.5 |
| (14) | Mn(OAc)$_2$·4H$_2$O | 25 | TBT | 30 | 37.5 | — | — | 66 | 1.5 | 0.75 | 0.22 | 2.0 | 5.5 |
| (15) | KOAc | 70 | TBT | 30 | — | 142 | — | — | 0.0 | 0.75 | 0.25 | 2.1 | 10.5 |
| (16) | KOAc | 25 | TBT | 30 | 37.5 | 51 | — | — | 1.5 | 0.75 | 0.22 | 2.0 | 5.5 |

Notes:
Abbreviations in the table mean each the following.
Mn(OAc)$_2$·4H$_2$O: Manganese acetate tetrahydrate
Co(OAc)$_2$·4H$_2$O: Cobalt acetate tetrahydrate
KOAc: Potassium acetate
NaOAc·3H$_2$O: Sodium acetate trihydrate
LiOAc: Lithium acetate
RbOAc: Rubidium acetate
Ca(OAc)$_2$.H$_2$O: Calcium acetate monohydrate
Mg(OAc)$_2$·4H$_2$O: Magnesium acetate tetrahydrate
DPG: Dipropylene glycol
TBT: Titanium tetrabutoxide
TMT: A reaction product of titanium tetrabutoxide-trimellitic anhydride in a molar ratio of 1/2
TPO: A reaction product of titanium tetrabutoxide-phenylphosphonic acid in a molar ratio of 1/2
TPI: A reaction product of titanium tetrabutoxide-phenylphosphinic acid in a molar ratio of 1/2
(1) means "Transesterification Catalyst".
(2) means "Polymerizing Reaction Catalyst".
(3) means "Trimethyl Phosphate".
(4) means "Content of Alkali Metal Element".
(5) means "Content of Alkaline Earth Metal Element".
(6) means "Content of Manganese Element".
(7) means "Intrinsic Viscosity".
(8) means "Content of DPG".
(9) means "Content of Cyclic Dimer".
(10) means "Color after Crystallization".
(11) means "(Expressed in Terms of Ti atom)".
(12) means "Comparative Example 1".
(13) means "Comparative Example 2".
(14) means "Comparative Example 3".
(15) means "Comparative Example 4".
(16) means "Comparative Example 5".
Ex. means "Example".

TABLE 2

| | Drawn Yarn | | | | | | Light Resistance of Fabric Color b value | | |
|---|---|---|---|---|---|---|---|---|---|
| | (1) m/min | (2) Times | (3) | (4) dtex | (5) cN/dtex | (6) % | (7) | (8) | (9) |
| Example 1 | 2400 | 1.7 | 0.72 | 83 | 3.1 | 40 | 2.7 | 2.9 | 0.2 |
| Example 2 | 2400 | 1.7 | 0.71 | 83 | 3.0 | 42 | 2.3 | 2.6 | 0.3 |
| Example 3 | 2400 | 1.7 | 0.71 | 83 | 2.9 | 41 | 2.6 | 2.9 | 0.3 |
| Example 4 | 2400 | 1.7 | 0.72 | 83 | 3.1 | 40 | 2.5 | 3.0 | 0.5 |
| Example 5 | 2400 | 1.7 | 0.71 | 83 | 3.2 | 43 | 2.4 | 3.0 | 0.6 |
| Example 6 | 2400 | 1.7 | 0.72 | 83 | 3.0 | 40 | 2.4 | 3.0 | 0.6 |
| Example 7 | 2400 | 1.7 | 0.71 | 83 | 3.1 | 40 | 2.1 | 2.8 | 0.7 |
| Example 8 | 3600 | 1.2 | 0.71 | 83 | 3.1 | 42 | 2.8 | 3.0 | 0.2 |
| Example 9 | 2400 | 1.7 | 0.71 | 83 | 3.0 | 43 | 2.7 | 3.0 | 0.3 |
| Example 10 | 2400 | 1.7 | 0.71 | 83 | 3.1 | 40 | 2.6 | 2.7 | 0.1 |
| Example 11 | 2400 | 1.7 | 0.72 | 83 | 3.0 | 42 | 2.4 | 2.7 | 0.3 |
| Example 12 | 2400 | 1.7 | 0.71 | 83 | 2.9 | 41 | 2.3 | 3.3 | 1.0 |
| Example 13 | 2400 | 1.7 | 0.72 | 83 | 3.1 | 40 | 2.3 | 3.4 | 1.1 |
| Example 14 | 2400 | 1.7 | 0.71 | 83 | 3.2 | 43 | 3.0 | 2.7 | −0.3 |
| Example 15 | 2400 | 1.7 | 0.72 | 83 | 3.0 | 40 | 2.0 | 3.0 | 1.0 |
| Example 16 | 2400 | 1.7 | 0.71 | 83 | 3.1 | 40 | 2.1 | 3.3 | 1.2 |
| Example 17 | 2400 | 1.7 | 0.72 | 83 | 3.0 | 41 | 2.7 | 2.8 | 0.1 |
| Example 18 | 2400 | 1.7 | 0.72 | 83 | 3.0 | 39 | 2.5 | 2.8 | 0.3 |
| Example 19 | 2400 | 1.7 | 0.71 | 83 | 3.1 | 40 | 2.3 | 2.6 | 0.3 |
| Example 20 | 3600 | 1.2 | 0.71 | 83 | 3.1 | 42 | 2.7 | 2.8 | 0.1 |
| Example 21 | 2400 | 1.7 | 0.71 | 83 | 3.0 | 43 | 2.7 | 2.9 | 0.2 |
| (10) | 2400 | 1.7 | 0.73 | 83 | 3.3 | 42 | 2.2 | 4.7 | 2.5 |
| (11) | 2400 | 1.7 | 0.71 | 83 | 2.9 | 39 | 5.6 | 5.8 | 0.2 |
| (12) | 2400 | 1.7 | 0.72 | 83 | 3.1 | 41 | 2.5 | 4.7 | 2.2 |
| (13) | 2400 | 1.7 | 0.71 | 83 | 2.9 | 39 | 5.6 | 5.8 | 0.2 |
| (14) | 2400 | 1.7 | 0.72 | 83 | 3.1 | 41 | 2.5 | 4.7 | 2.2 |

Notes:
(1) means "Spinning Speed".
(2) means "Draw Ratio".
(3) means "Intrinsic Viscosity".
(4) means "Fineness".
(5) means "Tensile Strength".
(6) means "Tensile Elongation".
(7) means "Before Light Irradiation".
(8) means "After Light Irradiation".
(9) means "Increase before and after Irradiation".
(10) means "Comparative Example 1".
(11) means "Comparative Example 2".
(12) means "Comparative Example 3".
(13) means "Comparative Example 4".
(14) means "Comparative Example 5".

INDUSTRIAL APPLICABILITY

According to the present invention, there can be provided a polyester based on poly(trimethylene terephthalate) capable of improving light resistance of the polyester based on the poly(trimethylene terephthalate) and suitable for producing formed products responsive to wide demands because forming conditions such as yarn manufacturing conditions are not strictly limited. The industrial significance of the present invention is great.

The invention claimed is:

1. A polyester based on poly(trimethylene terephthalate) consisting essentially of trimethylene terephthalate repeating units, comprising at least one kind of compound selected from the group consisting of manganese compounds in an amount of 10 to 150 ppm expressed in terms of the manganese element, and the molar ratio of the amount of the total amount of elements of the contained manganese element to the amount of the contained phosphorus element is within the range of the following formula (I):

$$0 \leq P/M \leq 1 \qquad (I)$$

wherein, P is the molar amount the phosphorus element in the polyester; M is the total molar amount of manganese element, and wherein the content of a cyclic dimer is within the range of 0.01 to 2.2% by weight based on the total weight of the polyester.

2. The polyester according to claim 1, wherein the following respective requirements (a) to (d) are simultaneously satisfied,
   (a) the intrinsic viscosity is within the range of 0.5 to 1.6,
   (b) the content of dipropylene glycol is within the range of 0.1 to 2.0% by weight based on the total weight of the polyester, and
   (c) the color b value is within the range of −5 to 10.

3. The polyester according to claim 1, wherein the manganese compounds are compounds selected from the group consisting of manganese acetate, manganese benzoate and manganese chloride.

4. A method for producing a polyester based on poly (trimethylene terephthalate) comprising using a titanium compound as a polymerization catalyst when the polyester according to claim 1 is produced.

5. The method for production according to claim 4, wherein the titanium compound is a titanium tetraalkoxide.

6. The method for production according to claim 4, wherein the titanium compound is a reaction product of at least one compound selected from the group consisting of phthalic acid, trimellitic acid, hemimellitic acid and pyromellitic acid or anhydrides thereof with a titanium tetraalkoxide.

7. The method for production according to claim 4, wherein the titanium compound is a reaction product of a titanium tetraalkoxide with a phosphonic acid compound.

8. The method for production according to claim 4, wherein the titanium compound is a reaction product of a titanium tetraalkoxide with a phosphinic acid compound.

9. The method for production according to claim 4, wherein the titanium compound is a reaction product of a titanium tetraalkoxide with a phosphate compound.

10. The method for production according to claim 4, wherein the titanium compound is a reaction product of a reaction product between at least one compound selected from the group consisting of phthalic acid, trimellitic acid, hemimellitic acid and pyromellitic acid or anhdyrides thereof and a titanium tetraalkoxide with a phosphonic acid compound.

11. The method for production according to claim 4, wherein the titanium compound is a reaction product of a reaction product between at least one compound selected from the group consisting of phthalic acid, trimellitic acid, hemimellitic acid and pyromellitic acid or anhydrides thereof and a titanium tetraalkoxide with a phosphinic acid compound.

12. The method for production according to claim 4, wherein the titanium compound is a reaction product of a reaction product between at least one compound selected from the group consisting of phthalic acid, trimellitic acid, hemimellitic acid and pyromellitic acid or anhydrides thereof and a titanium tetraalkoxide with a phosphate compound.

13. Polyester fibers based on poly(trimethylene terephthalate) which are obtained by melt spinning the polyester based on the poly(trimethylene terephthalate) according to claim 1 at a melting temperature of 238 to 275° C. and a spinning speed of 400 to 5000 m/mm.

14. A polyester drawn yarn based on the poly(trimethylene terephthalate) obtained after winding the fibers according to claim 13 once or without winding the fibers once and continuously subjecting the fibers to drawing treatment.

15. A fabric which is composed of a polyester comprising the polyester fibers based on the poly(trimethylene terephthalate) according to claim 13 and has an increase in color b value of 2 or below after irradiation at 60° C. for 80 hours using a sunshine weatherometer.

16. A fabric which is composed of a polyester comprising the polyester drawn yarn based on the poly(trimethylene terephthalate) according to claim 13 and has an increase in color b value of 2 or below after irradiation at 60° C. for 80 hours using a sunshine weatherometer.

* * * * *